United States Patent [19]

Melzer et al.

[11] Patent Number: 4,897,166

[45] Date of Patent: Jan. 30, 1990

[54] ANTIFOAMING ADDITIVE FOR ACID LIQUIDS

[75] Inventors: Detlef Melzer, Cologne; Erhardt Tabel, Leverkusen; Hans-Peter Biermann, Krefeld, all of Fed. Rep. of Germany

[73] Assignee: Bayer Aktiengesellschaft, Leverkusen, Fed. Rep. of Germany

[21] Appl. No.: 214,769

[22] Filed: Jul. 5, 1988

[30] Foreign Application Priority Data

Jul. 14, 1987 [DE] Fed. Rep. of Germany ....... 3723198

[51] Int. Cl.$^4$ ................................................. C25D 3/10
[52] U.S. Cl. ........................................ 204/51; 558/45; 558/170; 558/174
[58] Field of Search ..................... 204/51; 558/45, 170, 558/174

[56] References Cited

U.S. PATENT DOCUMENTS

| | | | |
|---|---|---|---|
| 2,915,554 | 12/1959 | Ahlbrecht et al. | 564/96 |
| 3,188,340 | 6/1965 | Mackenzie et al. | 558/170 |
| 3,310,480 | 3/1967 | Brown | 204/51 |
| 3,745,097 | 7/1973 | Chessin et al. | 204/51 |
| 3,911,056 | 10/1975 | Houghton et al. | 558/175 |
| 4,167,460 | 9/1979 | Tomaszewski | 204/51 |
| 4,202,706 | 5/1980 | Newell et al. | 428/457 |
| 4,293,441 | 10/1981 | Newell et al. | 252/389.22 |

FOREIGN PATENT DOCUMENTS

| | | |
|---|---|---|
| 1493944 | 6/1972 | Fed. Rep. of Germany . |
| 2203119 | 8/1973 | Fed. Rep. of Germany . |
| 1559565 | 1/1980 | Fed. Rep. of Germany . |

OTHER PUBLICATIONS

Kosolapoff-Meier, Organic Phosphorous Compound, vol. 6, pp. 211 et seq., Verlag Wiley, New York 1973.
Kosolapoff-Meier, Organic Phosphorous Compound, vol. 6, pp. 227–228, Verlag Wiley, New York 1973.
J. Afzal et al., J. Fluorine Chem. 34, 385 (1987).

Primary Examiner—G. L. Kaplan
Attorney, Agent, or Firm—Connolly and Hutz

[57] ABSTRACT

Acidic liquids, such as galvanic electrolyte solutions for metal electroplating, contain a surfactant and a foam inhibiting agent which is a perfluoroalkyl-containing ester of phosphoric acid.

13 Claims, No Drawings

ANTIFOAMING ADDITIVE FOR ACID LIQUIDS

ANTIFOAMING ADDITIVE FOR ACID LIQUIDS

This invention relates to agents for suppressing foam in baths, mordants and electrolyte solution which contain inter alia surfactants to reduce the surface tension.

BACKGROUND OF THE INVENTION

Surface-active, chemically resistant compounds are added to acid mordants and galvanic electrolyte solutions and to comparable acid baths for metal surface treatments because of the gas evolved in the process, especially hydrogen, and to a less extent also the anodic evolution of oxygen and the resulting spray mists of acid, corrosive and in some cases toxic aerosols.

Perfluoralkylated sulphonates having cations of the type of tetraalkylammonium, for example, are used for drastically reduced surface tension.

The desired high interface activity of the surface-active additive, however, is frequently accompanied by the formation of foam which under certain operating conditions and processes may in extreme cases prevent the normal development of the process and therefore makes the use of surfactants questionable.

This applies particularly to mordanting or galvanic baths which have a geometrically unfavorable configuration with great depth and, by comparison, small bath surface, or when the current densities are used which give rise to a correspondingly intensive evolution of hydrogen.

The formation of foam and its intensity depend on the surface tension, i.e. the quantity of surfactant, the temperature and the mechanical movement of the solution and mechanical destruction of the foam and the extent to which the bath is filled with workpieces to be treated at any one time.

It is already known to counteract this disturbing formation of foam by adding foam inhibiting agents, also known as defoamers, foam preventing agents or antifoamants, such as fats, oils, long chained alcohols or glycols, alkylphosphates, metal soaps, special silicone defoamers, commercial perfluoroalkyl-modified hydrocarbon defoamers and perfluoroalkyl-substituted silicones to the mordants and baths (Kirk-Othmer (3.), Vol. 7: 430–48; Glodmann, Chem. Industrie 20 (1968), 335-7).

Fully fluorinated alkylphosphonates are described in German No. 2,233,941 as antifoamants for alkylsulphonates used in textile finishing. In corrosive media such as highly acid and oxidizing galvanic baths, these compounds are ineffective and undergo decomposition.

Conventional commercially available additives for foam prevention in surface-active solutions cannot be used in acid mordants and galvanic baths owing to the physical and chemical conditions prevailing there and the temperature, the flow of current, the low pH and the powerful oxidizing effect.

Commercial antifoamants cannot withstand the operating conditions (e.g. of pH values below 1), elevated temperatures, current densities possibly of about 80 A/dm$^2$ and $CrO_3$ concentrations (e.g. of 250 g/l) and therefore have no suitable antifoaming action under these conditions. Moreover, the products of decomposition of these agents are liable to contaminate the bath and may interfere with subsequent steps of the process of metal deposition or mordanting.

Special perfluoroalkyl-substituted phosphoric acid esters [$R_fSO_2N(R)$—$R'$—$O$—$P(O)(OM)_2$] and a process for their preparation are disclosed in German No. 2,713,498. These compounds may be used as interface active agents.

The problem therefore arose of providing a foam inhibiting agent which would be effective at an extremely low concentration without affecting the general properties of the bath and without altering the mordanting action or deposition of metal on workpiece in galvanic processes.

To meet the technical requirements of a satisfactory foam inhibiting agent in highly acid solutions such as galvanic baths, the agent must meet the following criteria:

The foam inhibiting agent should generally act rapidly but its action should persist over a long period.

The method of adding the antifoamant to the acid bath should be very simple so that it can be widely and effectively used. This may be achieved, for example, by suitable formulation of the active ingredient in an aqueous or organic solution or suspension in water or organic liquids with or without the addition of co-surfactants. The solvent or dispersing agent used is preferably water although organic carrier substances could be used in the formulations since the additive is used in such very small doses in the bath that it should not interfere with the treatment of the workpiece.

In addition to the required surface activity, the agent must also be soluble or dispersible and it must be chemically extremely resistant to acid and oxidizing media even at elevated temperatures. It should be compatible with the salts present in the mordants or galvanic baths and should be effective even at the very lowest concentrations without interfering with the process and should be completely free of any adverse effects on the mordanting or metallizing process. In addition, any losses due to the additive being carried out with the bath should be easy to control and compensated by suitable subsequent additions. Since a co-surfactant is also used to lower the surface tension, the activity of the latter must, of course, also be unimpaired.

BRIEF DESCRIPTION OF THE INVENTION

The present invention is directed to a foam inhibiting composition which comprises a surfactant and a perfluoroalkyl-containing ester of phosphoric acid. In a further embodiment, the invention also relates to an acid liquid stabilized against foaming and containing a surfactant and a perfluoralkyl-containing ester of phosphoric acid.

DETAILED DESCRIPTION

The present invention relates to agents for suppressing foam in acid liquids which contain esters of phosphoric acid carrying perfluoroalkyl groups in addition to conventional surfactants for lowering the surface tension.

The foam inhibiting agents used in acid liquids of the present invention are preferably phosphoric acid esters corresponding to the following formula:

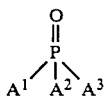

wherein
A¹, A² and A³ may be identical or different and denote the hydroxyl group or a group of the following formula:

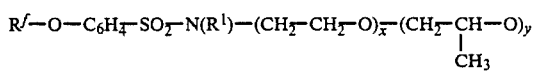

wherein
$R^f$ denotes a straight chained or branched aliphatic perfluoroalkyl group having 4 to 12 carbon atoms,
x represents an integer with a value from 1 to 10,
y represents an integer with a value from 0 to 10 and
$R^1$ denotes hydrogen or an alkyl or aryl group with 1 to 6 carbon atoms.

Phosphoric acid esters in which the above-mentioned groups $A_1$, $A_2$ and $A_3$ are groups corresponding to the following formulae are also preferred:

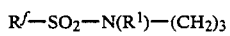

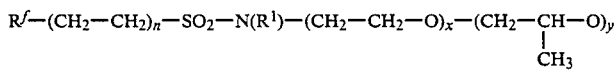

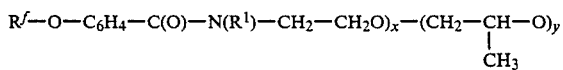

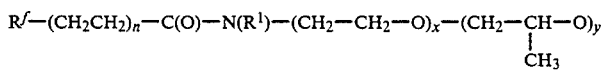

wherein
$R^f$, x, y and $R^1$ have the same meaning as above and n represents an integer with a value from 1 to 10.

The foam inhibiting agents used in acid liquids are preferably phosphoric acid esters corresponding to the following formula:

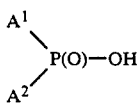

wherein
A¹ and A² may be identical or different and stand for a group corresponding to the following formula:

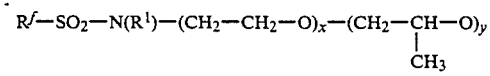

wherein
$R^f$, $R^1$, x and y have the same meaning as above.

The phosphoric acid esters containing perfluoro groups are present at concentrations of from 0.01 to 10 mg/l, preferably from 0.1 to 1 mg/l, in the acid liquids which contain surfactants. These foam inhibiting agents are added to the acid liquid as aqueous or organic solutions or suspensions together with the surface-active fluorinated surfactants.

These agents are used in acid liquids, in particular in electrolyte solutions for the production of galvanic metal coats containing perfluoroalkylated surfactants to reduce the surface tension, especially in electrolyte solutions containing hexavalent chromium compounds and fluorinated surfactants for the production of chromium layers (e.g. hard or gloss chromium layers).

It is advantageous that the application according to the invention of a compound corresponding to above formula as foam inhibiting agent ensures that the additive has a high resistance to the chemically corrosive baths used in this field of application, and in particular a high resistance to heat, strong acids and oxidizing agents. The compatibility with salts and ionic or non-ionic compounds such as alkyl or perfluoroalkyl sulphonates even at pH levels below 1 is a major reason for the wide application of the compounds of the above formula. The prevention of foam formation or the destruction of existing foam by means of these foam inhibiting additives is widely used for many technical processes, e.g. in the metal industry, in galvanic processes, in etching and mordanting processes, in the leather and paper industry, in liquors and solutions used for textile finishing and in flotation processes. The general defoaming action of the additive described here, however, is not limited to its use in the above mentioned applications in which extreme conditions prevail but can be used quite generally wherever defoaming of baths and mordants containing anion-active surfactants or fluorinated surfactants is required.

The present invention is particularly important for the use of surface-active perfluoroalkylated surfactants in fields of application where this has hitherto not been possible owing to the side effects of the surfactants, especially the foam formation. As an example may be mentioned the galvanic treatment of workpieces in baths with a geometrically unfavorable configuration, especially in deep baths.

In industrial use, the defoaming additive according to the invention is simple to handle since the losses due mainly to the removal of the finished workpieces are virtually the same for both additives, namely the fluorinated surfactant and the defoaming agent, and may therefore be made good by regular after-dosing.

One unexpected feature is the phase of initiation of the action of the added defoamer-surfactant. Depending on the geometry of the bath and the chemical composition of the electrolyte or mordant solution, the layer of foam produced by the surface active fluorine compound which is added to suppress the formation of spray mists initially remains unchanged for several hours. At the end of this period, the foam disintegrates within a few minutes without forming again.

Methods of preparation of the compounds of the above formulae used according to the invention are known in the literature. Bis-(perfluoroalkylsulphonamido-alkoxy)-phosphoric acid, for example, may be prepared by a technically advantageous process of synthesis from the corresponding perfluoroalkylated sulphonamido alcohol by reacting this with a stoichiometric quantity of phosphorus oxy-chloride in the heat so that hydrogen chloride is split off and subsequently saponifying the reaction product (see German No. 1,493,944).

The following embodiments given by way of example do not limit the invention.

The following are examples of compounds which may be used according to the invention:
(1) Bis-(N-methyl-perfluorobutylsulphonamido-ethoxy)-phosphoric acid
(2) Bis-(N-methyl-perfluorooctylsulphonamido-ethoxy)-phosphoric acid
(3) (N-Methyl-perfluorobutylsulphonamido-ethoxy)-(N-methyl-perfluorooctylsulphonamido-ethoxy)-phosphoric acid.

Derivatives which have short carbon chains between the perfluoroalkylated sulphonamide and the phosphoric acid group are preferred, e.g.

$(R^f—SO_2—N(R^1)—CH_2—CH_2—O—)_2P(O)—OH$ wherein $R^1$ is methyl and the perfluoro hydrocarbon group has 4 carbon atoms.

Under the conditions of the industrial processes, addition of preferably 0.1 to 1 mg/l of the surfactant acting as defoamer according to the invention is to be recommended. This corresponds to about 1/1000 of the concentration of surfactant required for reducing the surface tension to suppress the spray mists in galvanic processes or mordanting processes.

The molar concentration of the agent used is extremely low and has not led to any undesirable effects in any of the processes in the fields of application investigated.

The exact concentration of surfactant used for defoaming within the concentrations given is generally adjusted to the particular operating conditions since the parameters such as the geometry of the bath and of the workpiece, the output rates of the bath and the quantity of workpieces to be treated in the bath determine the concentration required so that no generally applicable figure can be given for individual cases.

The foam inhibiting agents according to the invention and their use will now be illustrated with the aid of an example which should not be regarded as a limitation.

EXAMPLE

As little as 100 to 125 mg of tetraethyl ammonium perfluorooctylsulphonate per liter of electrolyte is sufficient in a conventional process to lower the surface tension to such a level, i.e. below 30 mN/m, that no spray mists such as acid aerosols can be produced. This concentration of fluorinated surfactant is essential for achieving optimum effect with the lowest possible consumption of surfactant (H. G. Klein, J. N. Meussdörffer, H. Niederprüm: Metalloberfläche 29 (1975), No. 11, 559 et seq).

A typical example for the application of the defoamer according to the invention, e.g. in chromium electrolytes for hard chromium plating of workpieces, is a mixture of 125 mg/l of the above-mentioned fluorinated surfactant with 0.15 mg/l of bis-(2-(N-methylperfluorobutyl-sulphonamido)ethoxy)phosphoric acid, the $CrO_3$-content of the electrolyte being 250 g/l and the sulphate ion content 2.5 g/l. When the chromium plating conditions are 30 A/dm$^2$ at 55° C. for 5 hours, about 100 m$\mu$ of chromium with a Vickers hardness of over 900 are deposited:

The surface tension of the electrolyte solution was about 24 mN/m. The formation of foam occurring with the use of fluorinated surfactants could be suppressed.

What is claimed is:

1. In an acidic liquid a surfactant and a foam inhibiting agent, the improvement comprises said foam inhibiting agent being perfluoroalkyl-containing esters of phosphoric acid.

2. An acidic liquid according to claim 1 wherein the foam inhibiting agent is the ester of phosphoric acid corresponding to the formula:

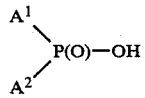

wherein $A^1$, $A^2$ and $A^3$ are identical or different and each independently denotes a moiety corresponding to the formula:

$R^f—SO_2—N(R^1)—(CH_2—CH_2—O)_x—(CH_2—CH—O)_y$
$\phantom{R^f—SO_2—N(R^1)—(CH_2—CH_2—O)_x—(CH_2—}|$
$\phantom{R^f—SO_2—N(R^1)—(CH_2—CH_2—O)_x—(CH_2—}CH_3$ wherein
$R^f$ denotes a straight chained or branched aliphatic perfluoroalkyl moiety having 4 to 12 carbon atoms,
x represents an integer with a value from 1 to 10,
y represents an integer with a value from 0 to 10 and
$R^1$ denotes hydrogen, alkyl with 1 to 6 carbon atoms, or phenyl, 3. An acidic liquid according to claim 1 wherein the amount of ester of phosphoric acid is from 0.01 to 10 mg/l.

4. An acidic liquid according to claim 3 wherein the amount of ester of phosphoric acid is from 0.1 to 1 mg/l.

5. An acidic liquid according to claim 1 wherein the ester of phosphoric acid is present as aqueous or organic solutions or suspensions together with surface-active fluorinated surfactants.

6. An acidic liquid according to claim 1 which is an electrolyte solution for the production of galvanic metal coats and contains perfluoralkylated surfactants for reducing surface tension.

7. An acidic liquid according to claim 1 which is an electrolyte solution for the production of galvanic chromium layers as hard or gloss chromium by electrolytic deposition of chromium, said electrolyte solution containing hexavalent chromium compounds and fluorinated surfactants.

8. An acidic liquid according to claim 1 wherein the foam inhibiting agent is the ester of phosphoric acid corresponding to the formula:

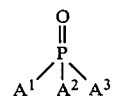

wherein $A^1$, $A^2$ and $A^3$ are identical or different and each independently denotes a moiety corresponding to the formula:

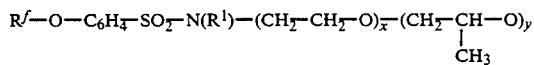

or hydroxyl with the proviso that at most two of $A^1$, $A^2$ and $A^3$ are hydroxyl, and R$^f$ denotes a straight chained or branched aliphatic perfluoroalkyl moiety having 4 to 12 carbon atoms,
x represents an integer with a value from 1 to 10,
y represents an integer with a value from 0 to 10 and
$R^1$ denotes hydrogen, alkyl with 1 to 6 carbon atoms, or phenyl.

9. An acidic liquid according to claim 1 wherein the foam inhibiting agent is the ester of phosphoric acid corresponding to the formula:

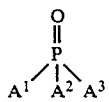

wherein $A^1$, $A^2$ and $A^3$ are identical or different and each independently denotes a moiety corresponding to the formula:

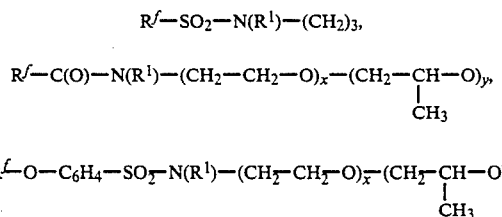

or hydroxyl with the proviso that at most two of $A^1$, $A^2$ and $A^3$ are hydroxyl, and R$^f$ denotes a straight chained or branched aliphatic perfluoroalkyl moiety having 4 to 12 carbon atoms,
n represents an integer with a value from 1 to 10,
x represents an integer with a value from 1 to 10,
y represents an integer with a value from 0 to 10 and
$R^1$ denotes hydrogen, alkyl with 1 to 6 carbon atoms, or phenyl.

10. A foam inhibiting composition which comprises a surfactant and a perfluoroalkyl-containing ester of phosphoric acid.

11. The foam inhibiting composition according to claim 10 wherein the ester of phosphoric acid corresponds to the formula:

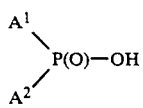

wherein $A^1$, $A^2$ and $A^3$ are identical or different and each independently denotes a moiety corresponding to the formula:

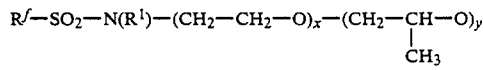

wherein
R$^f$ denotes a straight chained or branched aliphatic perfluoroalkyl moiety having 4 to 12 carbon atoms,
x represents an integer with a value from 1 to 10,
y represents an integer with a value from 0 to 10 and
$R^1$ denotes hydrogen, alkyl with 1 to 6 carbon atoms, or phenyl.

12. The foam inhibiting composition according to claim 10 wherein the ester of phosphoric acid corresponds to the formula:

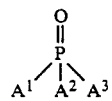

wherein $A^1$, $A^2$ and $A^3$ are identical or different and each independently denotes a moiety corresponding to the formula:

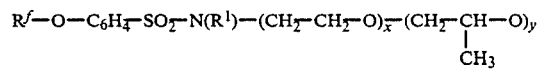

or hydroxyl with the proviso that at most two of $A^1$, $A^2$ and $A^3$ are hydroxyl, and R$^f$ denotes a straight chained or branched aliphatic perfluoroalkyl moiety having 4 to 12 carbon atoms,
x represents an integer with a value from 1 to 10,
y represents an integer with a value from 0 to 10 and
$R^1$ denotes hydrogen, alkyl with 1 to 6 carbon atoms, or phenyl.

13. The foam inhibiting composition according to claim 10 wherein the ester of phosphoric acid corresponds to the formula:

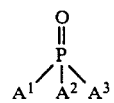

wherein $A^1$, $A^2$ and $A^3$ are identical or different and each independently denotes a moiety corresponding to the formula:

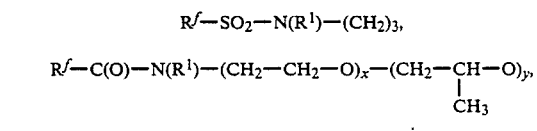

or hydroxyl with the proviso that at most two of $A^1$, $A^2$ and $A^3$ are hydroxyl, and R$^f$ denotes a straight chained or branched aliphatic perfluoroalkyl moiety having 4 to 12 carbon atoms,
n represents an integer with a value from 1 to 10,
x represents an integer with a value from 1 to 10,
y represents an integer with a value from 0 to 10 and
$R^1$ denotes hydrogen, alkyl with 1 to 6 carbon atoms, or phenyl.

* * * * *